United States Patent [19]

Brixy et al.

[11] Patent Number: 4,627,744
[45] Date of Patent: Dec. 9, 1986

[54] TEMPERATURE SENSOR UTILIZING THERMAL NOISE AND THERMAL COUPLE ELEMENTS, AND ASSOCIATED CONNECTING CABLE

[75] Inventors: Heinz Brixy, Niederzier; Hubert Hoewener, Aachen, both of Fed. Rep. of Germany

[73] Assignee: Kernforschungsanlage Julich GmbH, Julich, Fed. Rep. of Germany

[21] Appl. No.: 630,596

[22] Filed: Jul. 13, 1984

[30] Foreign Application Priority Data

Jul. 14, 1983 [DE] Fed. Rep. of Germany ....... 3325381

[51] Int. Cl.$^4$ .......................... G01K 7/06; G01K 7/30
[52] U.S. Cl. .................................... 374/175; 374/179; 374/185; 136/232
[58] Field of Search ............... 374/163, 175, 179, 185; 136/232

[56] References Cited

U.S. PATENT DOCUMENTS

| | | | |
|---|---|---|---|
| 3,956,936 | 5/1976 | Brixy | 374/175 |
| 3,964,314 | 6/1976 | Brixy | 374/175 |
| 3,966,500 | 6/1976 | Brixy | 374/163 |
| 4,133,700 | 1/1979 | Hollander et al. | 374/163 |
| 4,278,828 | 7/1981 | Brixy et al. | 374/175 |

Primary Examiner—Charles Frankfort
Assistant Examiner—Thomas B. Will
Attorney, Agent, or Firm—Karl F. Ross; Herbert Dubno

[57] ABSTRACT

A temperature sensor utilizes a resistive element and a thermocouple. One or more leads of the thermocouple are surrounded (electrically insulated) by a conductor or conductors constituting the connections to the resistive element. The conductors are made of a nonmagnetic material. In one embodiment, the second thermocouple lead is constructed as a hollow pipe which constitutes a protective outer casing for the necessary unit, as well as a connection to the resistive element. Embodiments utilizing a plurality of thermocouples are illustrated, as is a similarly constructed cable for connecting the sensor unit to measuring apparatus.

15 Claims, 13 Drawing Figures

TEMPERATURE SENSOR UTILIZING THERMAL NOISE AND THERMAL COUPLE ELEMENTS, AND ASSOCIATED CONNECTING CABLE

FIELD OF THE INVENTION

Our invention relates to temperature sensors. More particularly, it relates to sensors which use both a resistive element which generates a temperature-dependent noise voltage and a thermoelectric element which creates an emf in accordance with the temperature at its junction. Our invention also relates to a connecting cable for such a sensor.

BACKGROUND OF THE INVENTION

For the measurement of temperatures, especially with electrical or electronic instruments, various basic principles have been employed. For example, it is known to measure temperatures by detecting the potential difference or emf produced by wires of dissimilar metallic and/or semi-conductive temperature-sensitive elements such as thermocouples or thermopiles. Such systems produce an emf which is a function of temperature and may be used for a wide variety of temperature-measuring purposes.

However, when such thermoelements are employed for the measurement of temperatures above about 1000° C. or when the measuring instruments or sensor is to be located in an environment which may be destructive to the sensor, the accuracy of the measurement leaves much to be desired and considerable error is introduced.

Apparently maintaining the dissimilar-metal wires at an elevated temperature for long periods varies the emf per °C. which is generated by the system, perhaps as a result of interdiffusion of the metals, diffusion of impurities from a furnace atmosphere into the wires or like changes in the sensor. The prolonged exposure to high temperatures may also affect the leads or conductors. These disadvantages are observed even when the system is enclosed in a ceramic sleeve.

It has also been proposed to avoid the disadvantages of conventional temperature-sensing systems by providing so-called noise-thermometers which utilize a different principle. A noise-thermometer system utilizes a metallic strand, wire, or film which generates an electrical output by thermal agitation of electrical charges within the conductor. The output is a noise voltage and is produced in the electrical conductor by such thermal agitation. Thermal noise, also known as JOHNSON noise, can be produced in a conductor even at temperatures approaching 0° K. at which thermocouples become noticeably less efficient, and may be particularly suitable for the measurement of temperatures in the range of several hundred °K. The available thermal-noise power is proportional to the absolute temperature over the frequency band width over which the noise is measured. With a fixed band width, the available thermal-noise power can be measured in terms of the noise voltage and is proportional to absolute temperature. The theory of such systems and various circuits utilizing the principles of JOHNSON noise and temperature measurement are described in U.S. Pat. Nos. 2,710,899, 2,728,835, 2,768,266 and 2,884,786.

Frequently it is desirable to have available another temperature-measuring instrument with which a thermocouple can be calibrated with the aid of a noise thermometer or vice versa. For this reason two instruments are required and the introduction of both simultaneously to the measurement site may post a problem. Furthermore, when reference to one and another indicator must be made repeatedly, the problem has been all but insurmountable with conventional systems.

We have previously disclosed a sensor including both a resistive element and a thermoelectric element in U.S. Pat. Nos. 3,966,500 and 3,956,936 (see also German Patent Nos. DE-PS 22 63 469 and DE-PS 23 20 741). However, the output conductors of these sensor constituted the signal carriers both for the resistive element and the thermoelectric element or elements. The conductors thus had to be made of the thermocouple material. This constitutes a disadvantage particularly when long connecting cables are required. Thermocouple material has a high specific resistivity compared to copper. This causes increased damping resulted from a higher series resistance, poorer matching than is possible with copper because of the greater magnitude of the series resistance and also because of variations with frequency, and increased parasitic noise which must be eliminated when the cross correlation is carried out.

OBJECTS OF THE INVENTION

It is an object of our invention to provide a temperature sensor of the above-described type in which the negative effects described above are largely eliminated.

It is a further object of our invention to provide a cable suitable for connection to the above-described sensor.

SUMMARY OF THE INVENTION

The above-described objects are accomplished in accordance with our invention by a construction in which at least one lead of the thermoelectric element constitutes an internal conductor, and this internal conductor is surrounded, electrically insulated, by the conductor connected to the resistive element.

In a preferred embodiment, the inner lead and surrounding conductor constitutes a coaxial cable, the inner conductor being made of the selected thermoelectric material, while the surrounding conductor is made of copper. As mentioned above, the outer conductor of this coaxial line constitutes the connections to the resistive element or elements, while the inner conductors constitute the leads of the thermocouple.

Preferably, the material for the conductor connecting to the resistive element is made of a nonmagnetic material such as copper, inconel, etc. This eliminates the "magnetic interference" which is frequently induced in the magnetic Ni lead by mechanical vibration of the sensor in combined NiCi-Ni thermoelectric elements. Since mechanical vibration can seldom be avoided in industrial surroundings, an important technical problem is solved by use of the sensor which, according to our invention, has connecting conductors of nonmagnetic material.

In addition, the use of nonmagnetic material decreases the variation with frequency of the parameters of the connecting line. This facilitates matching and allows the upper limit of the frequency range in which the line and the sensor can be adequately matched to one another to be shifted to a higher frequency, thereby decreasing the required measuring time.

The magnetic materials used prior to our present invention increase the internal inductivity of the line and, therefore, the total inductivity and the wave resistance. This increase of inductivity relative to lines utilizing nonmagnetic material is, typically, a factor of 10 to 15 for the usual NiCi thermocouples. This changes the wave resistance by a factor of approximately 3 to 4.

In addition to increasing the inductivity, magnetic lines substantially decrease the limiting frequency for the skin effect, thereby increasing the variation with frequency of both the inductivity and the resistivity of the line. For Ni leads having a diameter of 1 mm, a substantial increase of resistance and a decrease of the inductivity occur even at frequencies starting at 10 kHz.

When the conductors connected to resistive element are made of nonmagnetic material, the lack of magnetism also eliminates the transition from the magnetic to the nonmagnetic condition which would otherwise take place in the temperature region around the Curie temperature. This transition causes a lack of homogeneity at different locations along the line. This again makes matching more difficult. In addition, the matching varies in accordance with the temperature changes along the line. This makes the computation of an optimal resistance thermometer substantially more difficult.

Since the conductors connected to the resistance thermometer are constructed as hollow pipes rather than as solid cylinders, skin effect becomes effective at higher frequencies than before. This again decreases the change of the line parameters as a function of frequency. The frequency range in which it is possible to achieve matching is thus widened to include higher frequencies. As mentioned before, this decreases the required measuring time.

A sensor of our present invention differs from the known resistive element/thermoelectric element sensors in that copper can be used as material for the conductors connected to the resistive element up to a temperature of approximately 700° C. This results in a low specific resistance of such conductors (compared to Ni and NiCr), yielding a number of advantages:

improved possibilities for matching the resistive element to the line or cable due to the smaller resistance per unit length, and resulting shorter measuring times;

decreased correlative measuring errors resulting from the line resistances, that is exact measurement can be carried out with correspondingly longer mineral insulated lines;

less parasitic noise resulting from the line resistances, and corresponding the shorter measuring times;

in general, decreased problems resulting from external electromagnetic fields because of a decrease in induced noise signals; and additionally, it decreases in-phase and out-of-phase perturbations of the noise signals.

All of the abovementioned considerations are important, for example, for thermal noise temperature measurements in the core of light water moderated, gas cooled reactors.

A number of embodiments are possible for the sensors having connections to the thermocouple element and the resistive element arranged according to the principle of our present invention.

In a first embodiment, the sensing junction or junctions of one or more thermoelectric elements are connected to the resistive element. For example, the resistive element could be connected in series between the sensing junctions of two thermal electric elements as described in U.S. Pat. No. 3,966,500.

Alternatively, in a further preferred embodiment, the thermoelectric element or elements and the resistive element are electrically insulated from one another in the sensor.

According to another aspect of the invention, we provide a line or cable to be connected to a sensor including a resistive element and a thermoelectric element is provided with a metallic casing to be connected to the protective casing of the sensor. Specifically, the leads to the thermoelectric element constitute inner conductors within the casing, each being surrounded electrically insulated by a conductor to be connected to the resistive element.

The cable according to the present invention is connected to the sensor outside of the "hot zone" and may be insulated by synthetic material rather than the more generally used metal oxide insulation. Thus, use of a line in which the conductors to be connected to the resistive element are made of a nonmagnetic material such as copper, inconel, results in the same advantages specified above for a sensor utilizing nonmagnetic conductors.

The line or cable in accordance with our present invention is suitable for connection to a sensor in accordance with the present invention, as well as to sensors described in U.S. Pat. Nos. 3,966,500 and 3,956,936.

Another preferred embodiment of the present invention has four inner conductors to be connected to the thermoelectric elements, each being surrounded by a conductor to be connected to the resistive element, pairs of the inner conductors with associated surrounding conductors being additionally surrounded by a metallic shield arranged within the outer casing.

SPECIFIC DESCRIPTION

Figure 1:
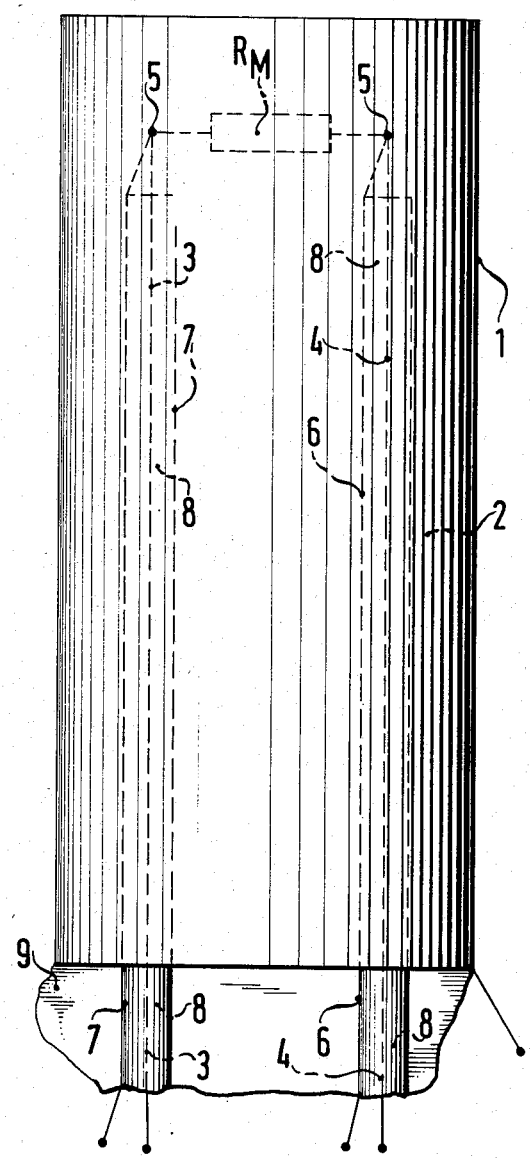
FIG. 1 is a schematic diagram illustrating a sensor having a thermoelectric element with a sensing junction, a resistive element being connected in series with a junction.

As shown in FIG. 1, an outer protective casing 1 encloses insulation 2. Within insulation 2, wires 3 and 4 constituting thermocouple leads have ends 5 constituting the sensing junction, ends 5 being connected to one another by means of an electric resistor $R_M$ constituting a resistance thermometer or resistive element. The thermocouple leads constitute inner conductors and are surrounded (electrically insulated) by the conductors 6 and 7 which are to be connected to resistance $R_M$. The thermocouple leads are located within an insulation 8. Outer protective casing 1 is sealed with a suitable sealer 9. Leads 3 and 4 pass through seal 9 and are to be connected to apparatus for measuring and displaying the voltage derived from the thermocouple. Conductors 6 and 7 also pass through seal 9 and are to be connected to apparatus for measuring the noise voltage.

Metal oxide, for example magnesium or aluminum oxide, is generally used in the sensor for insulations 2 and 8. On the other hand, the connecting cable, which is illustrated in cross section in the drawing, generally has an insulation made of a synthetic material. Thus insulations 2 and 8 consist of some suitable plastic or ceramic.

Figure 2:
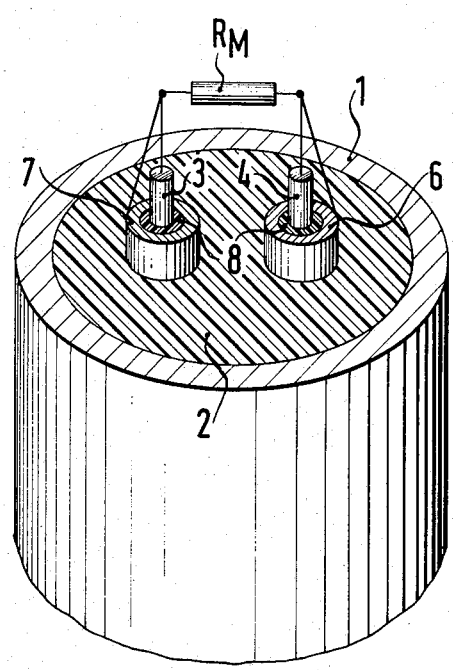
FIG. 2 is a different view of the sensing junction of the sensor of FIG. 1.
Figure 2A:
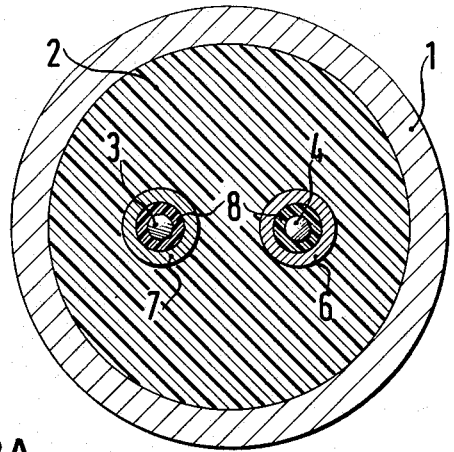
FIG. 2A is a cross section of a cable having two inner conductors.

The sensor illustrated in FIG. 2 corresponds to that shown in FIG. 1. However, the outer protective casing 1 is illustrated only in part. FIG. 2 also illustrates a cross section of an associated connecting cable having two inner conductors.

Figure 3:
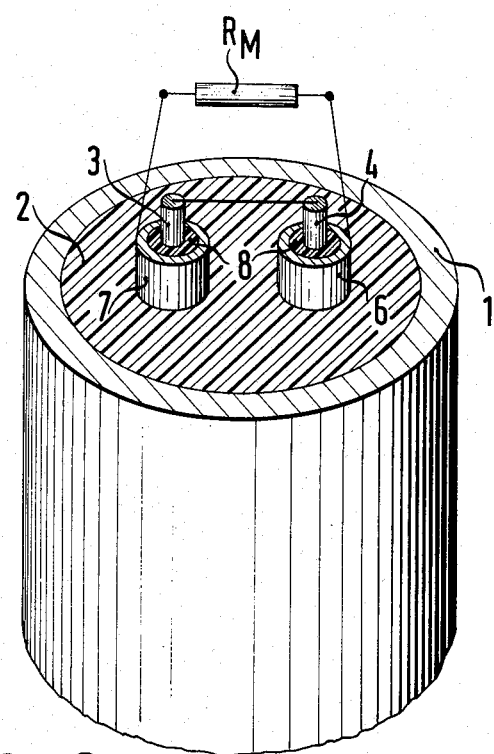
FIG. 3 is a schematic diagram illustrating a sensor wherein the sensing junction of the thermoelectric element and the resistive element are electrically insulated from one another.
Figure 3A:
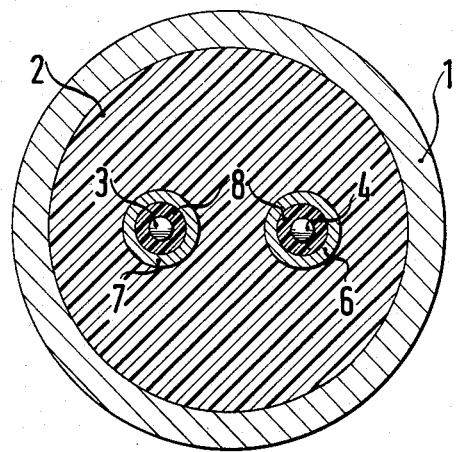
FIG. 3A is a cross section of a cable having two inner conductors.

In the embodiment illustrated in FIG. 3, the sensor, which is illustrated in the same way as that in FIG. 2, has a thermoelectric element and a resistance thermometer $R_M$ which are electrically insulated from one another. Again, a cross section of the associated connecting cable is also illustrated.

Figure 4:
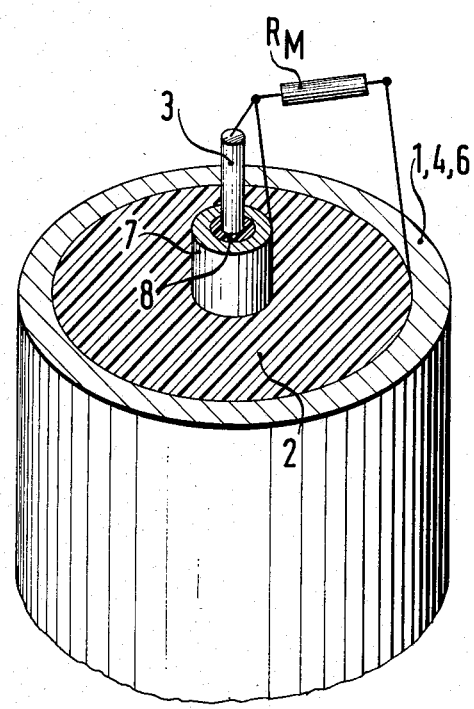
FIG. 4 is a diagram illustrating a sensor with a thermoelectric sensing junction, one of the legs of the thermocouple also constituting a protective casing.
Figure 4A:
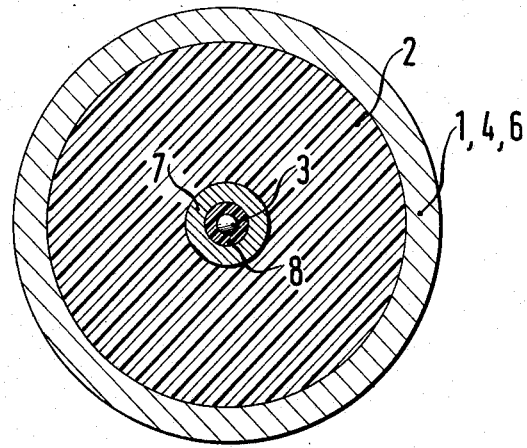
FIG. 4A is a cross section of a cable having a single inner conductor.

The embodiment illustrated in FIG. 4 also has only one sensing junction in addition to resistive element $R_M$. However, in this embodiment, lead 3 is surrounded by conductor 7 for resistance thermometer $R_M$, while lead 4 is constructed as a hollow pipe and carries out both the functions of conductor 6 and outer protective casing 1. Lead 4, in this embodiment, is made of nonmagnetic material. The embodiment illustrated in FIG. 4 may be utilized when the sensing junctions do not have to be insulated.

Figure 5:
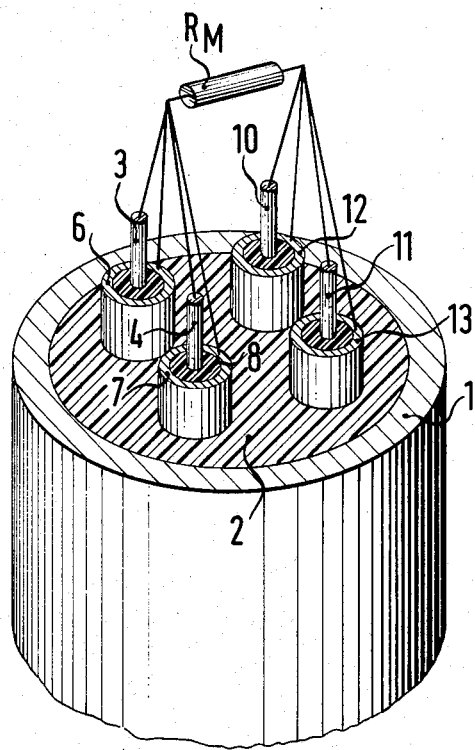
FIG. 5 shows a sensor having thermoelectric elements with two sensing junctions, the sensing junctions being connected to the resistive element.
Figure 5A:
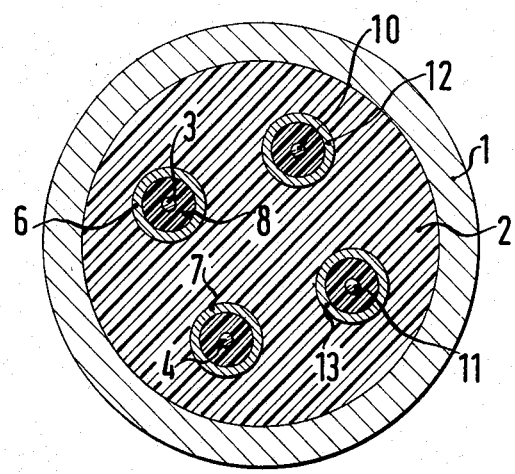
FIG. 5A is a cross section of a cable having four inner conductors.

In the embodiment illustrated in FIG. 5, two thermoelectric sensing junctions are provided in addition to the resistive element. The four leads constituting the thermocouples are leads 3 and 4 and leads 10 and 11. They are surrounded (electrically insulated) by conductors 6 and 7 as well as conductors 12 and 13 forming the connection to resistive element $R_M$. The leads constituting the thermocouples are electrically connected in pairs to conductors 6 and 7 as well as 12 and 13 and are thus also connected to resistive element $R_M$.

Figure 6:
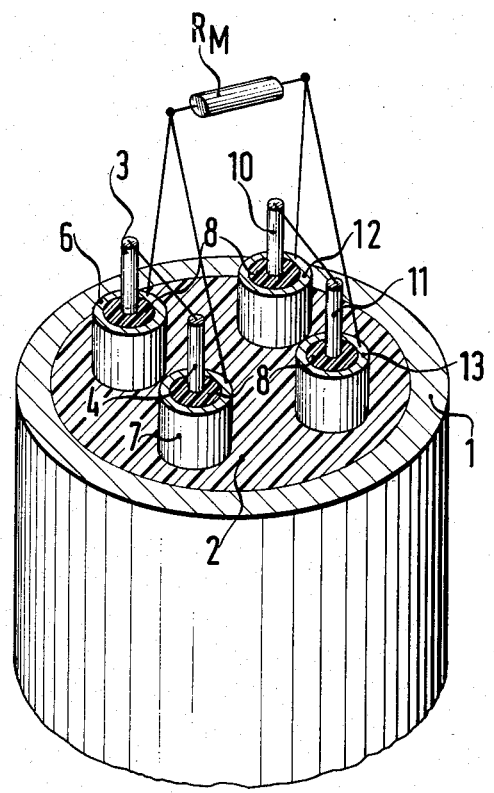
FIG. 6 is a diagram illustrating a sensor having two thermoelectric elements, the thermoelectric elements and the resistive element being electrically insulated from one another.
Figure 6A:
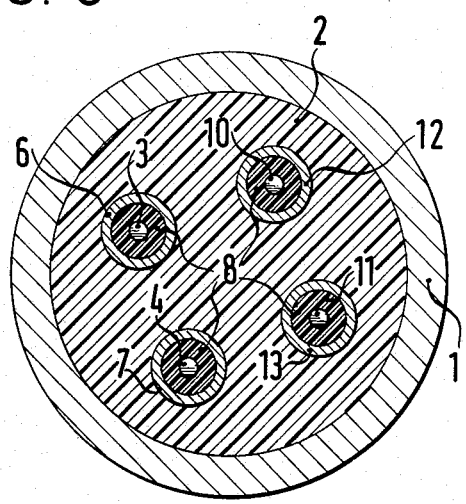
FIG. 6A is a cross section of a cable having four inner conductors.

The embodiment illustrated in FIG. 6 also has two thermocouples. However, the sensing junctions are electrically insulated from resistive element $R_M$.

Figure 7:
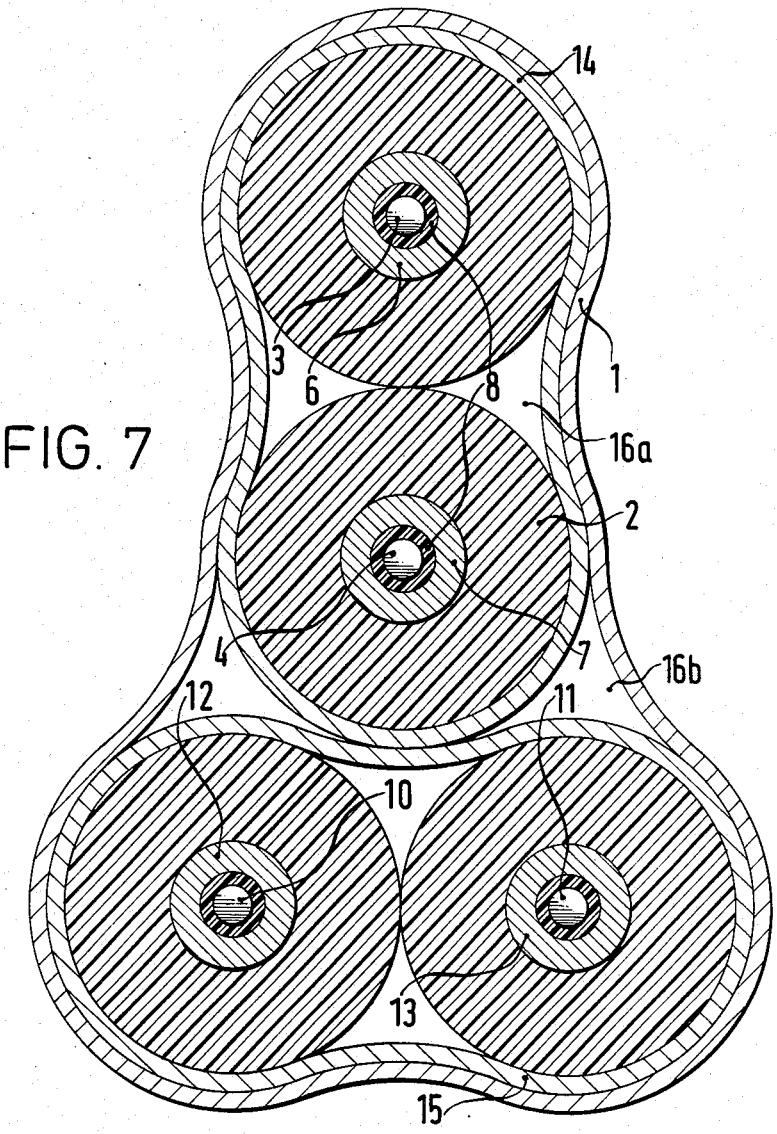
FIG. 7 is a diagram showing the cross section of a cable having four inner conductors, pairs of the inner conductors with corresponding surrounding conductor to be connected to the resistive element being surrounded by an additional metallic sheath.

In FIG. 7, a cross section through a line having four inner conductors is illustrated. Leads 3 and 4 as well as leads 10 and 11 are surrounded (electrically insulated) by conductors 6 and 7, 12 and 13, respectively. However, pairs of leads with associated surrounding conductors are additionally surrounded by metallic sheaths 14, 15 within outer casing 1. In the manufacturing process, air gaps 16a and 16b may remain within the metallic sheath or the protective outer casing.

Figure 8:
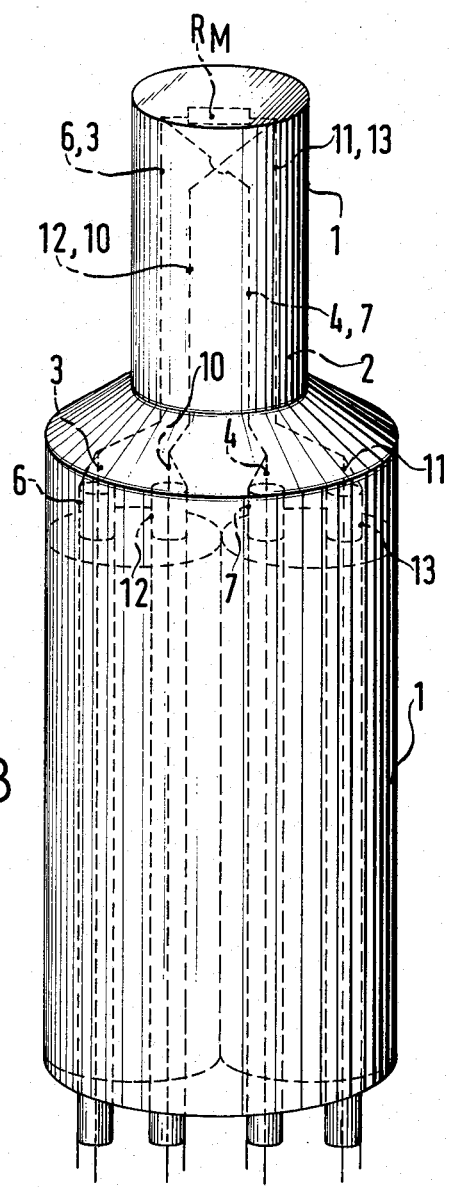
FIG. 8 is a diagram illustrating a sensor of conventional construction having two thermoelectric sensing junctions, connected to a cable according to the present invention.

In FIG. 8, a connecting cable or line in accordance with our present invention is connected to a sensor of conventional consturction. In this arrangement of sensor and connecting line or cable, the leads are only partially surrounded by the conductors namely in the connecting cable only. However, even this results in considerable improvement of the measurement.

A construction of the thermocouples and of the resistive element and their interconnection is described in detail in U.S. Pat. No. 3,956,936 and U.S. Pat. No. 3,966,500. These factors are given for reference only and are not required for understanding our present invention.

we claim:

1. A temperature sensor comprising:
   a metallic protective casing;
   a resistive element generating a temperature-dependent noise voltage and disposed within said casing and having at least one conductor independent from said casing extending therethrough in insulated relationship from said casing; and
   a thermoelectric element in said casing having first and second leads forming a junction generating a temperature-dependent electromotive force, said conductor being tubular, composed of a nonmagnetic material, and surrounding only one of said leads while being electrically insulated therefrom, said noise voltage being measured across said tubular conductor and a further conductor independent from said one of said leads, said electromotive force being measured across said leads.

2. The temperature sensor defined in claim 1 wherein said conductor is composed of a metal selected from the group which consists of copper and Inconel.

3. The temperature sensor defined in claim 1 wherein said junction is connected to a terminal of said resistive element.

4. The temperature sensor defined in claim 3 wherein said resistive element is connected between the ends of said leads.

5. The temperature sensor defined in claim 4 wherein each of said leads is surrounded by a respective conductor extending through said casing in insulated relationship from said casing and from the respective lead surrounded thereby, each of said conductors being connected to a terminal of said resistive element.

6. The temperature sensor defined in claim 1 wherein said thermoelectric element and said resistive element are electrically isolated from one another in said casing.

7. The temperature sensor defined in claim 1 wherein one terminal of said resistive element is connected to said conductor and another terminal thereof is electrically connected to said casing.

8. The temperature sensor defined in claim 7 wherein said junction is connected to said resistive element.

9. The temperature sensor defined in claim 8 wherein said one of said leads and said conductor are both electrically connected to one said terminal.

10. The temperature sensor defined in claim 1 wherein said conductor is isolated from said one of said leads by an insulator selected from the group which consists of magnesium oxide, aluminum oxide and a synthetic resin and said conductor is isolated from said casing by an insulation selected from the group which consists of magnesium oxide, aluminum oxide and a synthetic resin.

11. A connecting cable for a temperature sensor comprising a resistive element generating a temperature-dependent noise voltage and a pair of thermoelectric elements forming respective junctions generating a temperature-dependent electromotive force, said cable comprising:

a conductive casing;

at least two tubular conductors of a nonmagnetic material independent of said casing extending therethrough in insulating relationshp from said casing and connected to respective terminals of said resistive element for deriving said temperature-dependent noise voltage therefrom; and a pair of leads connected to each of said thermoelectric elements and extending through said casing, one of said leads of each pair traversing a respective one of said conductors and being electrically insulated therefrom.

12. The connecting cable defined in claim 11 wherein said conductor is composed of Inconel.

13. The connecting cable defined in claim 11 wherein said conductor is composed of copper.

14. The connecting cable defined in claim 11 wherein a respective tubular conductor surrounds each of said leads and said tubular conductors are connected in pairs to said terminals of said resistive element.

15. The connecting cable defined in claim 14 wherein said junctions are formed at the respective terminals of said resistive element.

* * * * *